United States Patent
Surikov et al.

(10) Patent No.: US 7,553,398 B2
(45) Date of Patent: Jun. 30, 2009

(54) PLANT FOR DECOMPOSITION OF WATER BY ELECTROLYSIS

(75) Inventors: Aleksandr Konstantinovich Surikov, Moscow (RU); Igor Nikolaevich Mogilevsky, Moscow (RU); Evgeny Mikhailovich Ovsyannikov, Moscow (RU)

(73) Assignee: OM Energy Ltd., London (GB)

( * ) Notice: Subject to any disclaimer, the term of this patent is extended or adjusted under 35 U.S.C. 154(b) by 277 days.

(21) Appl. No.: 11/205,771

(22) Filed: Aug. 17, 2005

(65) Prior Publication Data

US 2006/0032754 A1 Feb. 16, 2006

Related U.S. Application Data

(63) Continuation of application No. PCT/RU03/00413, filed on Sep. 18, 2003.

(51) Int. Cl.
*C25B 1/02* (2006.01)
*C25B 15/00* (2006.01)

(52) U.S. Cl. .................. 204/241; 204/660; 205/628

(58) Field of Classification Search ......... 204/198–227, 204/241, 660; 205/628
See application file for complete search history.

(56) References Cited

U.S. PATENT DOCUMENTS

| | | | | |
|---|---|---|---|---|
| 4,032,426 A | * | 6/1977 | de Nora et al. | 204/268 |
| 4,125,439 A | | 11/1978 | Fleischmann et al. | 204/212 |
| 4,235,694 A | | 11/1980 | Hall | 204/266 |
| 4,323,442 A | * | 4/1982 | Lantin et al. | 204/237 |
| 4,457,816 A | * | 7/1984 | Galluzzo et al. | 205/630 |
| 5,124,017 A | * | 6/1992 | Rogov et al. | 204/263 |
| 6,296,744 B1 | * | 10/2001 | Djeiranishvili et al. | 204/263 |
| 2002/0074243 A1 | * | 6/2002 | Nakamura et al. | 205/742 |

FOREIGN PATENT DOCUMENTS

RU 2224051 C1 * 2/2004

* cited by examiner

*Primary Examiner*—Harry D. Wilkins, III
*Assistant Examiner*—Nicholas A. Smith
(74) *Attorney, Agent, or Firm*—Novak Druce DeLuca + Quigg LLP

(57) ABSTRACT

The suggested plant for decomposition of water by electrolysis permits to convert mechanical and heat energy into electrical and chemical energy as it contains an electrolyzer comprising: a body installed on a shaft connected to a drive and incorporating ducts for supplying electrolyte solution and extracting the electrolysis products as well as an electrolyte solution drain duct; short-circuited electrodes—one electrode installed on the shaft and the other one formed by the internal surface of the body; and a heat exchanger. The plant is provided with top and bottom bearing units holding a vertical shaft; the external electrolyte solution circulation path contains the electrolyte solution ring chamber with a helix-shaped internal surface which is fixed to the top bearing unit; the electrolyte solution sensor is installed, and the electrolyte solution mixer is connected to water and electrolyte supply lines as well as to the electrolyte solution supply duct; the electrolyzer body is made of electrically conducting material and is provided with bottom and top covers made of electrically conducting material; the electrolyte solution extraction channel located in the top cover is equipped with an adjustable valve connected to the electrolyte solution ring chamber; the internal surface of the body has at least one guiding groove; the water supply line is equipped with a water flow regulator; the electrolysis products extraction line is provided with an electrolysis products pumping device; the heat exchanger is located in the external electrolyte solution circulation circuit; the electrolyte solution sensor is connected to the water flow regulator and the shaft drive.

19 Claims, 1 Drawing Sheet

PLANT FOR DECOMPOSITION OF WATER BY ELECTROLYSIS

CROSS-REFERENCE TO RELATED APPLICATIONS

This application is a continuation of application No. PCT/RU03/00413, filed Sep. 18, 2003.

TECHNOLOGY SPHERE

The invention relates to the area of electrochemistry and, more precisely, to designs of electrolyzers producing an oxygen-and-hydrogen mixture (detonating gas—hydrogen and oxygen) by electrolysis of water. The invention can be used as a source of detonating gas for gas flame technologies in a number of industries, for obtaining hydrogen fuel for internal combustion engines or other power or heat plants as well as oxygen for technological purposes in various industries.

EXISTING TECHNOLOGY

An electrolyzer of a known type produces an oxygen-and-hydrogen mixture (detonating gas) which is burnt in a number of gas flame devices in various industries. The electrolyzer body is installed on a rotating shaft; it has disc-type electrodes with milled ring grooves. The output of the electrolyzer is adjustable (RF Patent No 2006526, C25B 1/04, 1994).

The shortcomings of the device are its limited functional abilities as well as high power consumption as electric power for electrolysis is obtained from an external source.

Another centrifugal electrolyzer for producing hydrogen and oxygen by electrolysis of water contains a reservoir with a cylindrical body and a hollow shaft which is installed in bearings and can rotate. The shaft is kinematically connected to a drive and to an electric current generator. The reservoir is equipped with electrodes connected to the generator circuit and has channels for supplying raw materials and delivering final products of electrolysis; it is filled with electrolyte solution. On rotation of the reservoir mechanical energy of the drive is converted first into electrical energy and then into chemical energy of hydrogen and oxygen obtained from water (RF Patent No 2015395, F 02 M 21/00, 1990).

The shortcoming of the device is its low output due to the required sequence of energy conversion; the endothermic effect of the reaction of water decomposition is compensated for by the produced electric power without use of external heat energy.

The closest prior art (in terms of technical solution and obtained results) to the suggested plant is a device for conversion of energy by decomposition of water with electrolysis which consists of the following components: technological lines for supply of water and electrolyte and for extraction of the products of electrolysis; a rotating reservoir (filled with electrolyte solution) with a shaft connected to the drive; two electrodes that can be short-circuited to each other—one is installed on the shaft and the other is formed by the internal surface of the rotating reservoir; ducts in the shaft for supply of water and electrolyte and for extraction of the electrolysis products; heat exchanger and separator located inside the reservoir. Use of heat from any natural or man-made source increases the efficiency of electrolysis (RF Patent No 2174162, C25B 9/00, 1/02, F02M 21/02, 2001).

The shortcomings of the existing device are its low efficiency and instability of operation due to lack of control over the position of the border separating the electrolyte solution and gas medium in the rotating reservoir. As a result active surfaces of the electrode discs installed on the shaft are either in gas medium or in the area of electrolyte solution with low electrical potential; this means that the active surface of the electrode decreases and the process of electrolysis becomes less efficient. The device is also characterized by complexity of the design as it is technically difficult to deliver (and extract) a heat conducting substance to the heat exchanger located inside a rotating reservoir through ducts in a rotating shaft; besides current-conducting surfaces of the heat exchanger impede build-up of potential difference in electrolyte solution.

SUMMARY OF INVENTION

The technical result is increased output and simpler design of the plant as well as its wider functionality.

The technical result is obtained due to the following factors. The plant for decomposition of water by electrolysis comprises: lines for supplying water and electrolyte and for extracting electrolysis products; an electrolyzer having a body installed on a shaft connected to the drive and incorporating ducts for supplying electrolyte solution and extracting the electrolysis products as well as an electrolyte solution duct; short-circuited electrodes—one electrode installed on the shaft and the other one formed by the internal surface of the body; and a heat exchanger, wherein the plant's distinctive features are as follows: the plant is equipped with top and bottom bearing units holding a vertical shaft; an external path of electrolyte solution circulation containing an electrolyte solution ring chamber with a helix-shaped internal surface which is fixed to the top bearing unit; an electrolyte solution sensor is installed, and an electrolyte solution mixer is connected to water and electrolyte supply as well as to an electrolyte solution supply duct; the electrolyzer body is made of electrically conducting material and is provided with top and bottom covers of electrically conducting material; an electrolyte solution extraction channel is located in the top cover and is equipped with an adjustable valve leading to the electrolyte solution ring chamber; the water supply line is equipped with a water flow regulator; the electrolysis products extraction line is provided with an electrolysis products pumping device; the heat exchanger is located in the external electrolyte solution circulation path; the electrolyte solution sensor is connected to the water flow regulator and to the shaft drive. The plant can be equipped with a separator installed on the line for extracting the products of electrolysis and a protective casing. The electrolyzer body can be cylindrical, its internal surface can have at least one or preferably two guiding grooves and at least one of them should be screw-shaped; the electrode installed on the shaft can be made as a cone with cuts parallel to the shaft and a cylinder with radial openings fixed to the cone; an electromagnetic valve can be used as the water flow regulator; a vacuum pump can be employed for pumping the products of electrolysis.

DESCRIPTION OF DRAWING

A schematic view of the plant for decomposition of water by electrolysis is shown in the drawing.

The dimensions of separate assemblies and components are not to scale to enable clarity of understanding.

Figure 1:
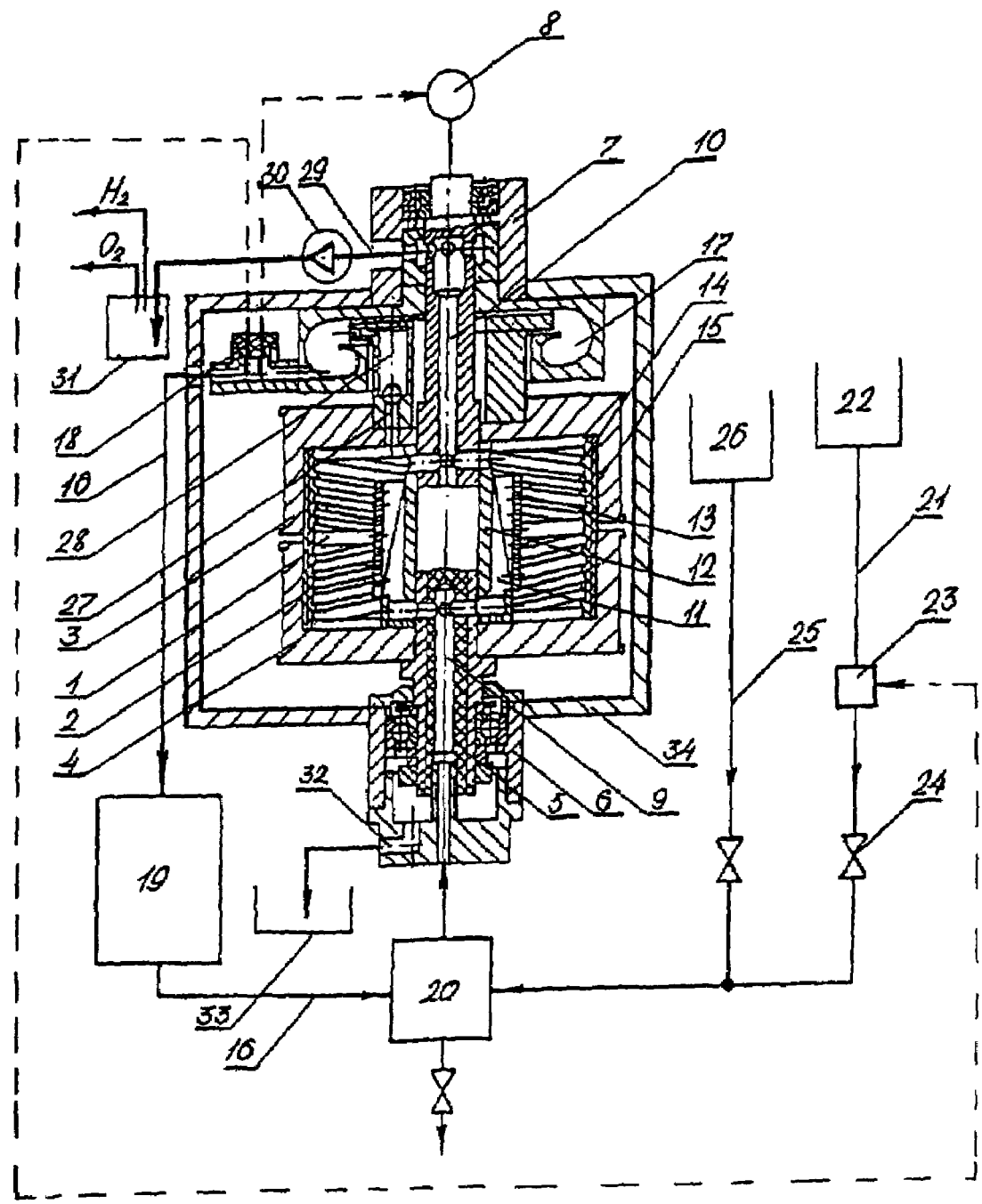

The plant comprises electrolyzer 1 which incorporates cylindrical body 2 of current-conducting material with top 3 and bottom 4 covers of current-conducting material; the body is located on vertical shaft 5 installed in bottom 6 and top 7 bearing assemblies; shaft 5 is connected to drive 8 and has internal ducts for supply of electrolyte solution 9 and for extraction of electrolysis products 10. Shaft 5 located inside electrolyzer 1 carries electrode 11 (for instance, cathode) consisting of cone 12 with cuts parallel to the shaft and cylinder 13 with radial openings fixed to cone 12. The internal surface 14 of body 2 forms the other electrode (for instance, anode); it has one or preferably two grooves 15 that can be screw-shaped. Electrolyzer 1 is equipped with external path of electrolyte circulation 16 composed of the following components: fixed ring chamber for electrolyte solution with helix-shaped internal surface 17 installed on top bearing assembly 7; electrolyte solution sensor 18; heat exchanger 19; electrolyte solution mixer 20 connected to electrolyte solution supply duct 9 located in shaft 5; water supply line 21 with water flow regulator 23, valve 24 and water reservoir 22; electrolyte supply line 25 and electrolyte reservoir 26. Top cover 3 of electrolyzer 1 has a duct for extraction of electrolyte solution 27 with adjustable valve 28 leading to the electrolyte solution ring chamber with helix-shaped internal surface 17. Electrolysis products extraction duct 10 is connected to the electrolysis products extraction line 29 equipped with an electrolysis products pumping device (for instance, an electrical vacuum pump) 30 and separator 31 for separating oxygen and hydrogen from an oxygen-and-hydrogen mixture. Electrolyte solution supply duct 9 is provided with a drain channel for electrolyte solution leaks 32 and reservoir for collecting electrolyte solution leaks 33. Electrolyte solution sensor 18 is connected to water flow regulator 23 and drive 8 of shaft 5. The plant is provided with protective casing 34.

Data Supporting Functioning of Invention

The plant functions as described below.

Electrolyte is delivered from reservoir 26 along the electrolyte supply line 25 to the electrolyte solution mixer 20, and then it comes to electrolyzer 1 through electrolyte solution supply duct 9 in shaft 5. Valve 24 on water supply line 21 is closed. When switched on, drive 8 of shaft 5 (installed vertically in bottom 6 and top 7 bearing assemblies) starts rotating electrolyzer 1 filled with electrolyte solution; it is accelerated until the process of electrolysis begins. While the electrolyzer accelerates, electrolyte solution begins circulating in external circulation path 16. The electrolyte solution sensor 18 responds and sends signal to electromagnetic valve 23 (or any other water flow regulator) which stops water supply; after that valve 24 should be opened. The plant gets switched over to automatic adjustment of water flow from water reservoir 22 to electrolyzer 1 through water supply line 21, electromagnetic valve 23, electrolyte solution mixer 20 and electrolyte solution supply duct 9.

In the process of production of hydrogen and oxygen the volume of electrolyte solution and its concentration in rotating electrolyzer 1 constantly change: the electrolyte solution concentration increases while its volume decreases. The border separating electrolyte solution and gas medium gets displaced, the electrolyte extraction duct becomes exposed to the area of gas medium and extraction of electrolyte from the electrolyzer stops; as a result circulation of electrolyte solution in the external circuit stops as well. The electrolyte solution sensor 18 simultaneously sends commands to the water flow regulator (electromagnetic valve 23) and rotation drive 8. Water starts being supplied to mixer 20; diluted electrolyte is then delivered to rotating electrolyzer 1 through electrolyte solution supply duct 9. Drive 8 starts braking the rotating electrolyzer 1. Due to force of inertia and screw-shaped grooves 15 electrolyte solution gets mixed. When circulation of electrolyte in external path 16 resumes and sensor 18 sends respective commands, electromagnetic valve 23 stops supply of water from water reservoir 22 along line 21, and drive 8 accelerates electrolyzer 1 again.

Vertical shaft 5 inside electrolyzer 1 carries one of the electrodes (for instance, cathode); it consists of cone 12 with cuts parallel to the shaft and cylinder 13 with radial openings which is fixed to cone 12. The internal surface 14 of body 2 acts as the other electrode (for instance, anode); it has one or several (preferably two) guiding grooves 15 that can be screw shaped. The grooves can also be spiral, annular or linear; a combination of these groove shapes can be also used.

Depending on chemical composition of the electrolyte each electrode in electrolyzer 1 can act as cathode or anode.

Cuts in cone 12, radial openings in cylinder 13 of electrode 11 and guiding screw grooves 15 on the internal surface 14 of body 2 improve delivery and mixing of the electrolyte solution.

The same purpose is served by short braking periods with further acceleration of drive 8 of shaft 5; they are initiated by commands from electrolyte solution sensor 18 installed in the external electrolyte solution circulation path 16.

In the process of rotation centrifugal force creates an artificial field of gravity in electrolyzer 1. It separates cations and anions which have, in the form of hydrates, significantly different mass. Heavier ions (for instance, anions) form a region of negative electrical charge near the internal surface 14 of body 2 (anode); it induces an adequate electric conductivity charge in body 2 made of electrically conducting material.

Light ions concentrate in the area between the anode and cathode 11 forming their own region of positive charge. If its potential is sufficient for creating an electrical field strong enough to deform hydrate envelopes of light ions, then the existing balance gets upset at cathode 11. Light ions move to surfaces 12 and 13 of cathode 11 and lose their charge. Heavy ions also transfer their charge to the anode; as a result direct electrical current starts flowing between the electrodes through bottom 3 and top 4 covers made of electrically conducting material and forming a short-circuited conductor. The electrolyte ions get reduced producing hydrogen and oxygen; intermediate products of electrolysis enter into secondary reactions with water.

Reduced hydrogen and oxygen float to the centre of electrolyzer 1. Then the oxygen-and-hydrogen mixture is delivered to the consumer through the electrolysis products extraction duct 10 and electrolysis products extraction line 29 with the help of the electrolysis products pumping device 30 (for instance, vacuum pump). Separator 31 can be installed in the plant for separating oxygen-and-hydrogen mixture into oxygen and hydrogen; separated gases are then fed to consumers of hydrogen fuel and oxygen.

The electrolysis products (oxygen-and-hydrogen mixture—detonating gas) pumping device 30 prevents leaks of hydrogen and oxygen from the plant into the environment.

Electrolyte solution enters the external electrolyte solution circulation path 16 through the electrolyte solution extraction duct 27 with adjustable valve 28 connected to the electrolyte solution fixed ring chamber with helix-shaped internal surface 17. It further moves through heat exchanger 19 to electrolyte solution mixer 20, and then back to rotating electrolyzer 1 along electrolyte solution supply duct 9 of shaft 5. This describes circulation of electrolyte solution in the external path 16. Possible leaks of electrolyte solution from duct 9 are drained through the electrolyte solution drain duct 32 to drain reservoir 33; electrolyte solution is delivered from there to the electrolyte solution reservoir 26.

The internal surface of the electrolyte solution fixed ring chamber 17 (belonging to the electrolyte solution external circulation path 16) is helix shaped; this helps to dampen vortical stream of electrolyte solution coming from rotating electrolyzer 1.

The process of decomposition of water into hydrogen and oxygen by reduction of their ions is accompanied by decrease of the electrolyte solution enthalpy. As a result the solution temperature constantly drops; if heat loss is not compensated for, the solution will freeze and the process will stop. Therefore the solution must be heated. This task is accomplished by heat exchanger 19 installed in the external electrolyte solution circulation circuit 16. The function of the heat conducting substance is accomplished by the electrolyte solution. Heat energy to heat exchanger 19 can be supplied as exhaust gases, coolant from internal combustion engines or from other sources.

In the process of production of hydrogen and oxygen the volume of electrolyte solution and its concentration in rotating electrolyzer 1 constantly change: the electrolyte solution concentration increases while its volume decreases. In order to ensure a sufficient area of contact of electrolyte solution with electrode 11 in the high electrical potential zone at constantly changing volume of electrolyte solution as well as to form a gas medium space, electrode 11 (installed on vertical shaft 5) is made as cone 12 with cylinder 13 fixed to it.

The body of electrolyzer 1 should be cylindrical; this simplifies the design.

To meet the safety requirements the plant can be provided with protective casing 34.

INDUSTRIAL USE

The suggested plant converts mechanical and heat energy into electrical and chemical energy.

The invention permits to increase the efficiency of a plant. The plant is sufficiently simple, it is made of traditional construction materials with use of existing electrolytes. It can be used with internal combustion engines of transportation means in order to increase their fuel efficiency as well as with steam turbines of thermal and atomic power plants, for utilizing industrial heat in metallurgy etc.

The invention claimed is:

1. A plant for decomposition of water by electrolysis comprising:
    lines for supplying water and electrolyte and for extracting electrolysis products;
    an electrolyzer having a body installed on a shaft connected to a drive and incorporating ducts for supplying electrolyte solution and extracting the electrolysis products as well as an electrolyte solution drain duct;
    short-circuited electrodes—one electrode installed on the shaft and the other one formed by the internal surface of the body; and a heat exchanger;
    top and bottom bearing units holding a vertical shaft;
    an external electrolyte solution circulation path containing an electrolyte solution ring chamber with a helix-shaped internal surface which is fixed to the top bearing unit;
    an electrolyte solution sensor is installed, and
    an electrolyte solution mixer is connected to water and electrolyte supply lines as well as to the electrolyte solution supply duct;
    the electrolyzer body is made of electrically conducting material and is provided with bottom and top covers made of electrically conducting material;
    an electrolyte solution extraction channel is located in the top cover and is equipped with an adjustable valve connected to the electrolyte solution ring chamber;
    the water supply line is equipped with a water flow regulator;
    the electrolysis products extraction line is provided with an electrolysis products pumping device;
    the heat exchanger is located in the external electrolyte solution circulation path; the electrolyte solution sensor is connected to the water flow regulator and the shaft drive.

2. The plant for decomposition of water by electrolysis, according to claim 1, further comprising a separator installed on the electrolysis products extraction line.

3. The plant for decomposition of water by electrolysis, according to claim 1, further comprising a protective casing surrounding the electrolyzer.

4. The plant for decomposition of water by electrolysis, according to claim 1, wherein the electrolyzer body is cylindrical.

5. The plant for decomposition of water by electrolysis, according to claim 1, wherein the electrode on the shaft is made as a cone with cuts parallel to the shaft and carrying a cylinder with radial openings.

6. The plant for decomposition of water by electrolysis, according to claim 1, wherein the water flow regulator is an electromagnetic valve.

7. The plant for decomposition of water by electrolysis, according to claim 1, further comprising an electric vacuum pump used as the electrolysis products pumping device.

8. The plant for decomposition of water by electrolysis, according to claim 1, further comprising at least one guiding groove on the electrolyzer body internal surface.

9. The plant for decomposition of water by electrolysis, according to claim 8 with two grooves.

10. The plant for decomposition of water by electrolysis, according to claim 8, wherein the at least one guiding groove is screw-shaped.

11. The plant for decomposition of water by electrolysis, according to claim 2, further comprising a protective casing surrounding the electrolyzer.

12. The plant for decomposition of water by electrolysis, according to claim 2, wherein the electrolyzer body is cylindrical.

13. The plant for decomposition of water by electrolysis, according to claim 2, wherein the electrode on the shaft is made as a cone with cuts parallel to the shaft and carrying a cylinder with radial openings.

14. The plant for decomposition of water by electrolysis, according to claim 2, further comprising an electromagnetic valve used as water flow regulator.

15. The plant for decomposition of water by electrolysis, according to claim 2, further comprising an electric vacuum pump used as the electrolysis products pumping device.

16. The plant for decomposition of water by electrolysis, according to claim 2, further comprising at least one guiding groove on the electrolyzer body internal surface.

17. The plant for decomposition of water by electrolysis, according to claim 16, further comprising two grooves.

18. The plant for decomposition of water by electrolysis, according to claim 16, further comprising at least one screw-shaped guiding groove.

19. A plant for decomposition of water by electrolysis comprising:
    an electrolyzer, wherein the electrolyzer comprises
        a body, wherein the body is made of electrically conducting material, and wherein the body comprises a top bearing unit,
a bottom bearing unit,
an electrolyte solution ring chamber fixed to the top bearing unit, wherein the electrolyte solution ring chamber has a helix-shaped internal surface,
a top cover, wherein the top cover is made of electrically conducting material, and wherein the top cover comprises an electrolyte solution extraction channel, having an adjustable valve connected to the electrolyte solution ring chamber,
a bottom cover, wherein the bottom cover is made of electrically conducting material,
a first electrode formed by the internal surface of the body,
an electrolyte solution supply duct,
an electrolysis products extraction duct, and
an electrolyte solution drain duct,
a drive,
a vertical shaft, wherein the vertical shaft projects through the body, wherein the vertical shaft is held by the top bearing unit and the bottom bearing unit, and wherein the vertical shaft is connected to the drive,
a second electrode installed on the vertical shaft;
a water supply line;
a water flow regulator, regulating the flow of water through the water supply line;
an electrolyte supply line;
an external electrolyte solution circulation line connected to the electrolyte solution ring chamber;
an electrolyte solution sensor connected to the external electrolyte solution circulation line, wherein the electrolyte solution sensor sends at least one command to the water flow regulator and/or to the drive;
a heat exchanger located in the external electrolyte solution circulation line;
an electrolyte solution mixer connected to the water supply line, to the electrolyte supply line) and to an electrolyte solution circulation line;
an electrolysis products extraction line connected to the electrolysis products extraction duct; and
an electrolysis products pumping device connected to the electrolysis products extraction line.

* * * * *